(12) United States Patent
Boccara et al.

(10) Patent No.: US 11,543,641 B2
(45) Date of Patent: Jan. 3, 2023

(54) METHOD AND SYSTEM FOR FULL-FIELD INTERFERENCE MICROSCOPY IMAGING (71) Applicant: LLTECH MANAGEMENT, Paris (FR)

(72) Inventors: Albert Claude Boccara, Paris (FR); Fabrice Harms, Orsay (FR)

(73) Assignee: LLTECH MANAGEMENT, Paris (FR)

( * ) Notice: Subject to any disclaimer, the term of this patent is extended or adjusted under 35 U.S.C. 154(b) by 302 days.

(21) Appl. No.: 16/837,031

(22) Filed: Apr. 1, 2020

(65) Prior Publication Data

US 2020/0233198 A1 Jul. 23, 2020

Related U.S. Application Data

(63) Continuation of application No. 15/565,449, filed as application No. PCT/EP2016/057827 on Apr. 8, 2016, now Pat. No. 10,627,613.

(30) Foreign Application Priority Data

Apr. 10, 2015 (FR) ...................................... 1553120

(51) Int. Cl.
*G02B 21/14* (2006.01)
*G02B 21/12* (2006.01)
(Continued)

(52) U.S. Cl.
CPC ....... *G02B 21/125* (2013.01); *G01B 9/02091* (2013.01); *G01N 21/47* (2013.01);
(Continued)

(58) Field of Classification Search
CPC ...... G01B 9/02091; G01B 9/02; G01N 21/47; G01N 21/4795; G01N 2021/4709;
(Continued)

(56) References Cited

U.S. PATENT DOCUMENTS 5,459,564 A * 10/1995 Chivers ................ G01N 21/952
356/73.1
6,480,285 B1 * 11/2002 Hill ...................... G02B 21/006
356/497

(Continued)

OTHER PUBLICATIONS

International Search Report issued in Application No. PCT/EP2016/057827, dated Jul. 22, 2016 (3 pages).
(Continued)

*Primary Examiner* — Balram T Parbadia
(74) *Attorney, Agent, or Firm* — Osha Bergman Watanabe & Burton LLP (57) ABSTRACT

A system that includes an interference device including a reference arm on which a reflective surface is arranged, where the interference device produces, at each point of an imaging field when the sample is placed on a target arm of the interference device, interference between a reference wave and a target wave obtained by backscattering of incident light waves by means of a voxel of a slice of the sample at a given depth; an acquisition device suitable for acquiring, at a fixed path length difference between the target arm and the reference arm, a temporal series of N two-dimensional interferometric signals resulting from the interference produced at each point of the imaging field; and a processing unit that calculates an image representing temporal variations in intensity between said N two-dimensional interferometric signals.

8 Claims, 8 Drawing Sheets

(51) Int. Cl.
  *G01B 9/02091* (2022.01)
  *G02B 21/00* (2006.01)
  *G01N 21/47* (2006.01)
  *G02B 21/08* (2006.01)
  *G06T 5/50* (2006.01)
  *G02B 21/18* (2006.01)
  *G06T 1/00* (2006.01)

(52) U.S. Cl.
  CPC ..... *G01N 21/4795* (2013.01); *G02B 21/0004* (2013.01); *G02B 21/082* (2013.01); *G02B 21/14* (2013.01); *G06T 5/50* (2013.01); *G01N 2021/4709* (2013.01); *G02B 21/18* (2013.01); *G06T 1/0007* (2013.01); *G06T 2207/10101* (2013.01)

(58) Field of Classification Search
  CPC ............. G02B 21/0004; G02B 21/082; G02B 21/125; G02B 21/14; G02B 21/18; G06T 5/50; G06T 1/0007; G06T 2207/10101
  See application file for complete search history.

(56) References Cited

U.S. PATENT DOCUMENTS

| | | | | |
|---|---|---|---|---|
| 6,721,094 | B1* | 4/2004 | Sinclair | G01B 9/02082 359/368 |
| 7,034,271 | B1* | 4/2006 | Sinclair | G02B 21/18 250/201.3 |
| 7,623,908 | B2* | 11/2009 | Boppart | G01J 3/44 356/460 |
| 7,768,651 | B2* | 8/2010 | Ueno | A61B 3/102 356/497 |
| 8,054,468 | B2* | 11/2011 | de Boer | G01N 21/4795 356/497 |
| 2004/0105100 | A1* | 6/2004 | Shirley | G01B 11/2527 356/603 |
| 2005/0225769 | A1* | 10/2005 | Bankhead | G01B 11/2441 356/497 |
| 2007/0237445 | A1* | 10/2007 | Hatori | G02B 6/2843 385/11 |
| 2008/0304144 | A1* | 12/2008 | Reimer | A61B 90/36 359/377 |
| 2013/0088568 | A1 | 4/2013 | Nolte | |
| 2013/0107268 | A1* | 5/2013 | Boccara | G02B 26/06 356/450 |
| 2013/0107275 | A1 | 5/2013 | Boccara et al. | |
| 2013/0148106 | A1* | 6/2013 | Tearney | A61B 5/6852 356/72 |
| 2013/0182096 | A1* | 7/2013 | Boccara | G02B 21/16 348/79 |
| 2014/0375792 | A1* | 12/2014 | Yaqoob | G02B 21/0056 348/79 |

OTHER PUBLICATIONS

Jeong et al.; "Volumetric motility-contrast imaging of tissue reponse to cytoskeletal anti-cancer drugs;" Optics Express; vol. 15; No. 21; Oct. 11, 2007; XP055288832 (8 pages).

Hrebesh et al.; "In vivo imaging of dynamic biological specimen by real-time single-shot full-field optical coherence tomography;" Optics Communications; Oct. 30, 2008; XP025840731 (10 pages).

Hrebesh et al.; "Full-Field and Single-Shot Full-Field Optical Coherence Tomography: A Novel Technique for Biomedical Imaging Applications;" Advances in Optical Technologies; vol. 2012; XP055150097 (27 pages).

Farhat et al.; "Detecting apoptosis using dynamic light scattering with optical coherence tomography;" Journal of Biomedical Optics; vol. 16(7); Jul. 2011; XP055252554 (4 pages).

\* cited by examiner

METHOD AND SYSTEM FOR FULL-FIELD INTERFERENCE MICROSCOPY IMAGING

TECHNICAL FIELD

The present description relates to a full-field interference microscopy imaging method and system. It is applicable in particular to cellular and intracellular imaging.

STATE OF THE ART

The technique of image acquisition by incoherent light full-field interference microscopy, known by the name full-field OCT (OCT being the acronym for "Optical Coherence Tomography"), is a non-invasive, non-destructive and endogenous method which is very powerful for acquiring images of biological tissues.

The full-field OCT imaging technique is for example described in the article "Full-field optical coherence tomography" by A. Dubois and C. Boccara, taken from the work "Optical Coherence Tomography—Technology and Applications"—Wolfgang Drexler—James G. Fujimoto—Editors—Springer 2009. The full-field OCT imaging technique is also described in the French patent application FR2817030.

The full-field OCT imaging technique is based on the use of the light backscattered by a sample when it is illuminated by a light source with low coherence length, and in particular the use of the light backscattered by the microscopic cell and tissue structures in the case of a biological sample. This technique exploits the low coherence of the light source to isolate the light backscattered by a virtual slice depthwise in the sample. The use of an interferometer makes it possible to generate, by an interference phenomenon, an interference signal representative of the light originating selectively from a given slice of the sample, and to eliminate the light originating from the rest of the sample.

The full-field OCT imaging technique makes it possible to obtain images in three dimensions with a typical resolution of the order of 1 µm, which is greater than the resolutions of the order of 10 µm likely to be obtained with other conventional OCT techniques such as OCT in the spectral domain (known by the acronym "Fourier-Domain OCT" or "spectral domain OCT").

With such a resolution, it is possible to view most of the tissue structures of blood vessels, of their walls, the collagen, the adipocytes, etc. This technique thus makes it possible to view microstructures of diverse biological tissues such as the brain, the breast, the skin, the liver, etc., as is described for example in the article "*Large Field, High Resolution Full-Field Optical Coherence Tomography: A Pre-clinical Study of Human Breast Tissue and Cancer Assessment*", O. Assayag et al., Technology in Cancer Research and Treatment Volume 13, No. 5, October 2014. Furthermore, this technique proves to be particularly fast: it is thus possible to generate, using a full-field OCT microscope, an image representative of a depthwise slice whose surface is several cm² in just a few minutes.

Figure 1:
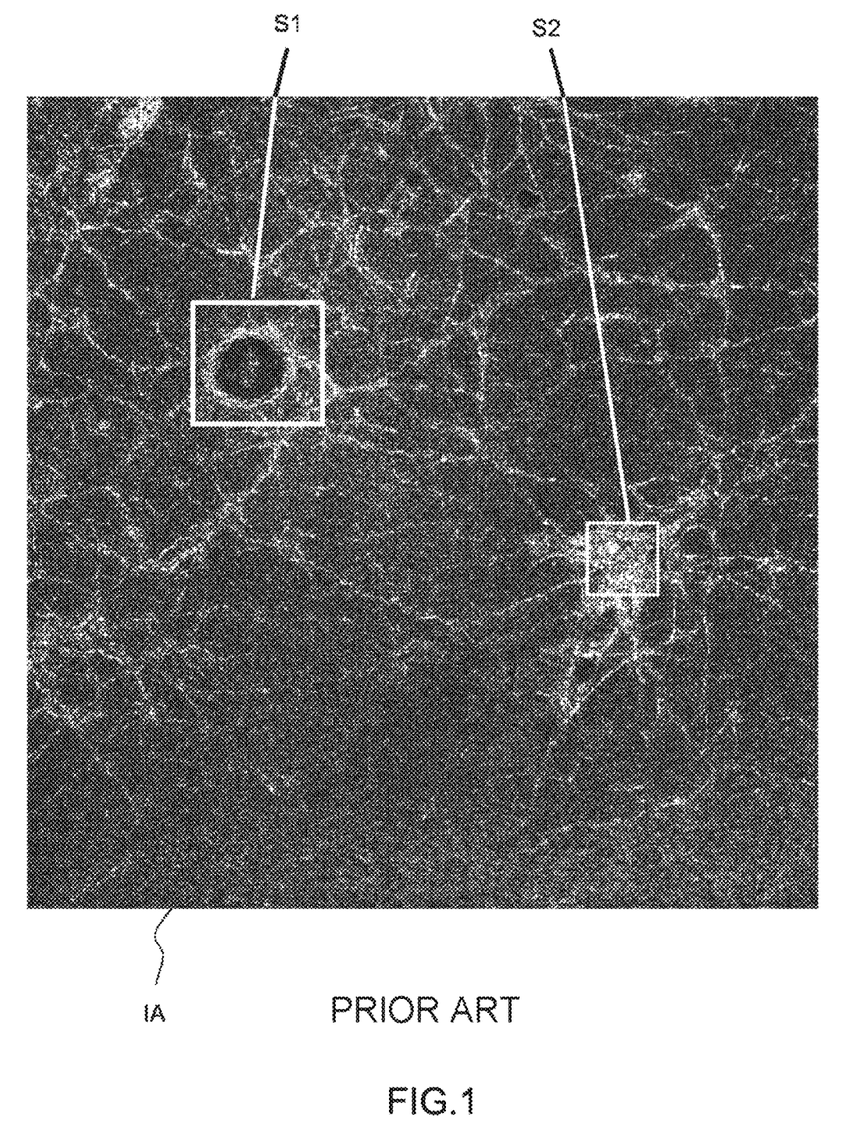
FIG. 1 (already described) is an example of an image, called FFOCT image, of a sample of biological tissue (rat liver) having collagen fibers produced by using a full-field OCT imaging method according to the prior art; such a method will hereinafter be called FFOCT imaging method.

FIG. 1 is an example of an image obtained by the full-field OCT technique for a tissue sample of a liver (optical biopsy performed on a rat liver) on which collagen fibers can in particular be seen. The image, reference IA, corresponds to a sample zone of 800 µm by 800 µm (micron) size. This figure illustrates the possibilities of this technique for revealing and viewing very fine biological structures.

It has been shown that the full-field OCT image acquisition technique can potentially be used for medical applications such as diagnosing cancer, since the viewing of the microstructures and of the tissue architecture makes it possible, in a great number of cases, to distinguish a healthy tissue from cancerous tissue in a few minutes, in a non-destructive manner. A full-field OCT image during the time of the operation makes it possible, for example, to produce a first level diagnosis, even optimize the surgical action in the case, for example, of cancers, to possibly avoid a repeat operation in the case where the histological analysis would reveal the presence of tumor cells just a few days after excision.

Furthermore, the full-field OCT technique allows image acquisition in-vivo, possibly in-situ with, for example, endoscopes, which reinforces the relevance of the technique in the medical field.

However, although the full-field OCT technique offers a theoretical spatial resolution that is sufficient to generate images of biological tissues to a cellular and intracellular scale (of the order of 1 µm in the three dimensions), the applicants have shown that, in practice, it does not always make it possible to clearly distinguish the cells, nor even nuclei or internal structures of cells (membrane, nucleus, cytoplasm in particular) because of an insufficient contrast in the images obtained.

For example, in the example of FIG. 1, the backscattered signal originating from collagen fibers exhibits, because of the high refractive index of the lipid and protein structures, a high intensity. By contrast, the backscattered signal originating from internal structures of the cells is of very low intensity, approximately 400 times lower than that of the collagen fibers. The difference of intensity of the signals backscattered by the different structures of the cell and of the tissue explains how, despite the excellent spatial resolution of the full-field OCT technology, this technology does not make it possible to acquire, with a sufficient dynamic range, the signals of low intensity.

Other microscopy techniques used in anatomical pathology, for their part, make it possible to view, by means of a microscope, cells and cell structures on a tissue sample: these techniques consist in taking a tissue sample in a zone to be analyzed, then preparing a slide of tissue that can be observed under a conventional microscope. The preparation consists in placing the tissue in paraffin, in cutting very thin slices thereof—of the order of 3 to 5 µm of thickness—and in applying contrast or coloring agents to these slices that make it possible to raise the contrast of the cell structures and thus facilitate the viewing thereof by the anatomical pathology doctor. Typically, a combination of hematoxylin and eosin is applied to these slices, in order to color the support structures and the nuclei of the cells specifically. Other colorations can also be applied to allow for certain structures to be viewed even more specifically. The resulting tissue slice is then placed on a microscope slide and observed at various enlargements by the anatomical pathologist. The macroscopic examination with low enlargement and the microscopic examination with strong enlargement make it possible to observe the tissue architecture and the cell details present on the tissue sample. A set of reading criteria makes it possible to perform a diagnosis of the cancer, with, for example, the examination of the stromal reaction resulting from the tumoral invasion or even the examination of the nucleus/cytoplasm ratio at the individual cell level.

These microscopy techniques do however present several drawbacks. Firstly, these techniques are destructive, since, contrary to the full-field OCT technique which makes it possible to obtain an image of a virtual slice of the tissue sample, these techniques necessitate preparing a physical slice of the sample as described. The tissue will thus no longer be usable for other types of analyses. Also, these techniques rely on a complex preparation of the sample, including the physical handling thereof during multiple steps (placing in paraffin, cutting, marking) as well as the use of exogenous contrast agents such as specific colorants of cellular structures; the final quality of the sample thus prepared, and consequently the quality of the corresponding diagnosis, is therefore dependent on the operator. Lastly, these techniques are not suited to a peroperative use, because, given the different steps to prepare the tissue, several days are generally needed before being able to proceed with an observation of the tissue.

There therefore emerges a need for an imaging technique for the acquisition of images of a sample, notably of a biological tissue, which at least partly remedies the limitations and/or drawbacks of the prior art.

SUMMARY

According to a first aspect, the present description relates to a system for full-field interference microscopy imaging of a diffusing three-dimensional sample comprising:
  an interference device comprising an object arm intended to receive the sample and a reference arm on which a reflection surface is arranged, the interference device being adapted to produce, when the sample is disposed on the object arm of the interference device, at each point of an imaging field, an interference between a reference wave obtained by of reflection of incident light waves on an elementary surface of the reflection surface corresponding to said point of the imaging field and an object wave obtained by backscattering of incident light waves by a voxel of a slice of the sample at a given depth, said voxel corresponding to said point of the imaging field,
  an acquisition device adapted to acquire, with fixed optical path difference between the object arm and the reference arm, a temporal succession of N two-dimensional interferometric signals resulting from the interferences produced at each point of the imaging field,
  a processing unit configured to compute an image representative of temporal variations of intensity between said N two-dimensional interferometric signals.

The imaging field is limited in its dimensions for example by a useful detection surface of the acquisition device or by a field diaphragm of the imaging system. Thus, according to one example, the imaging field at the level of the slice of the sample (or coherence slice) is the zone conjugate with the useful surface of the acquisition device (or with the field diaphragm). A "point" of the imaging field is defined in its dimensions by the dimensions of an elementary detector of the acquisition device.

An elementary surface of the reflection surface corresponding to a point of the imaging field represents, in the present description, an elementary surface defined on the reflection surface and whose position corresponds to the position of the point of the imaging field defined in relation to a two-dimensional coordinate system associated with the acquisition device.

A voxel corresponding to a point of the imaging field represents, in the present description, an elementary volume defined in the coherence slice and whose position in the coherence slice corresponds to the position of the point of the imaging field defined in relation to a two-dimensional coordinate system associated with the acquisition device. A wave backscattered by a voxel is representative of the amplitude of the coherent sum of the waves backscattered by all of the elementary diffusing structures present in this voxel.

The imaging system thus described makes it possible to obtain an image of the sample representative of temporal variations of intensity between the interferometric signals with fixed optical path difference, and for which the applicants have shown that it made it possible to access information not perceptible by means of the images obtained according to the full-field OCT techniques according to the prior art. Fixed optical path difference should be understood here to mean that the variation of optical path between the reference arm and the object arm is constant; for example, there is no relative variation of the position of the sample in relation to the reflection surface.

The advantages associated with this imaging technique in the field of cellular or intracellular imaging devolve notably from the observations made by the applicants as to the activity occurring at the cellular or intracellular level, and more specifically of the different movements causing the temporal variations of intensity between the interferometric signals: flow or circulation of liquids and also intracellular movements of different organites (or "organelles") such as cytoskeleton, cell nuclei, mitochondria, lysosomes, etc.

According to one or more embodiments of the imaging system, the processing unit is configured to compute the image by computing, for each pixel of given position in this image, a pixel value as a function of a value of a parameter representative of the temporal variations of intensity of the N two-dimensional interferometric signals acquired at a point of corresponding position in a two-dimensional coordinate system associated with the acquisition device.

The extraction of a parameter representative of the temporal fluctuations or variations, over a time period, of the intensities of the interferometric signals acquired at a given point, makes it possible to reveal, in the computed image, tissue and cell regions of the sample in which movements occur.

According to one or more embodiments, this parameter is a parameter representative of the temporal dispersion of the intensities of the N two-dimensional interferometric signals considered. Such a parameter is for example the standard deviation of the statistical distribution of the intensities. In this way, a global measurement is performed that is representative of the temporal dispersion of the light intensities backscattered at a given point of the biological tissue.

A representation in image form of the values obtained for this parameter makes it possible to reveal and view the tissue regions where movements occur.

According to one or more embodiments of the imaging system, a pixel of the image exhibits at least one component, defined in relation to a colorimetric representation space, whose value is a function of the value of the chosen parameter. For example, in the case of an image in gray levels, the zones of the sample which are animated by a significant movement and for which the value of this parameter is therefore high, emerge in such images with a high gray level. On the other hand, the parts for which no movement is detected and exhibiting a zero parameter value, will exhibit a very low gray level.

This image acquisition method is particularly interesting in the case of tissues exhibiting a wide variety of structures and therefore of diffusers, for which the dynamic range of the backscattered signal is very wide.

According to one or more embodiments of the imaging system:
the acquisition device is configured to also acquire P two-dimensional interferometric signals for the sample slice for different values of the optical path difference between the two arms of the interference device,
the processing unit is configured to compute an image, called combined image, from the intensities of the P two-dimensional interferometric signals and said temporal variations of intensity.

Compared to a tomographic image obtained by a full-field OCT imaging method according to the prior art, the combined image constitutes a representation of the sample that is more comprehensive and more rich in information on the different structures present in the sample because it combines, on the one hand, the information likely to be obtained by a full-field OCT imaging method according to the prior art, such information being representative of the intensities of the signals backscattered by the different voxels and, on the other hand, the information representative of the temporal variations of intensity of the signals backscattered by the different voxels.

According to one embodiment of the imaging system, the processing unit is configured to compute the combined image by computing, for a pixel of given position in the combined image, a pixel value as a function, on the one hand, of the intensities of the P two-dimensional interferometric signals acquired at a point of corresponding position in a two-dimensional coordinate system associated with the acquisition device and, on the other hand, of the temporal variations of intensity of the N two-dimensional interferometric signals acquired at a point of corresponding position in a two-dimensional coordinate system associated with the acquisition device.

The different embodiments of the imaging system according to the present description can be combined with one another.

According to a second aspect, the present description relates to a method for full-field interference microscopy imaging of a diffusing three-dimensional sample comprising:
the placement of the sample on an object arm of an interference device,
the production, by means of the interference device, for each point of an imaging field, of an interference between a reference wave obtained by reflection of incident light waves on an elementary surface of a reflection surface of a reference arm of the interference device, said elementary surface corresponding to the point of the imaging field, and an object wave obtained by backscattering of the incident wave by a voxel of a slice of the sample at a given depth, said voxel corresponding to said point of the imaging field,
the acquisition, with fixed optical path difference between the object arm and the reference arm, of a temporal succession of N two-dimensional interferometric signals resulting from the interferences produced at each point of the imaging field,
the computation of an image representative of temporal variations of intensity between the N two-dimensional interferometric signals.

According to one embodiment of the imaging method, the step of computation of the image comprises the computation, for each pixel of given position in the image, of a pixel value as a function of a value of a parameter representative of the temporal variations of intensity of the N two-dimensional interferometric signals acquired at a point of corresponding position in a two-dimensional coordinate system associated with the acquisition device.

According to a particular embodiment, this parameter is representative of the temporal dispersion of the intensities of the N two-dimensional interferometric signals acquired.

According to one embodiment of the imaging method, a pixel of the image exhibits at least one component, defined in relation to a colorimetric representation space, whose value is a function of the value of the chosen parameter.

According to one embodiment, the imaging method further comprises:
the acquisition of at least P two-dimensional interferometric signals for the sample slice for different values of the optical path difference between the two arms of the interference device,
the computation of an image, called combined image, from the intensities of the P two-dimensional interferometric signals and said temporal variations of intensity.

According to one embodiment of the imaging method, the computation of the combined image comprises, for each pixel of given position of the combined image, the computation of a pixel value as a function, on the one hand, of the intensities of the P two-dimensional interferometric signals acquired at a point of corresponding position in a two-dimensional coordinate system associated with the acquisition device and, on the other hand, of the temporal variations of intensity of the N two-dimensional interferometric signals acquired at a point of corresponding position in a two-dimensional coordinate system associated with the acquisition device.

The advantages stated for the imaging system can be transposed to the imaging method according to the second aspect of the present description.

The different embodiments of the imaging method according to the second aspect of the present description can be combined with one another.

Different features and embodiments of the various aspects of the present description can also be combined with one another.

BRIEF DESCRIPTION OF THE FIGURES

Other advantages and features of the imaging technique presented hereinabove will become apparent on reading the following detailed description, with reference to the figures in which.

DETAILED DESCRIPTION

Imaging System

Figure 2:
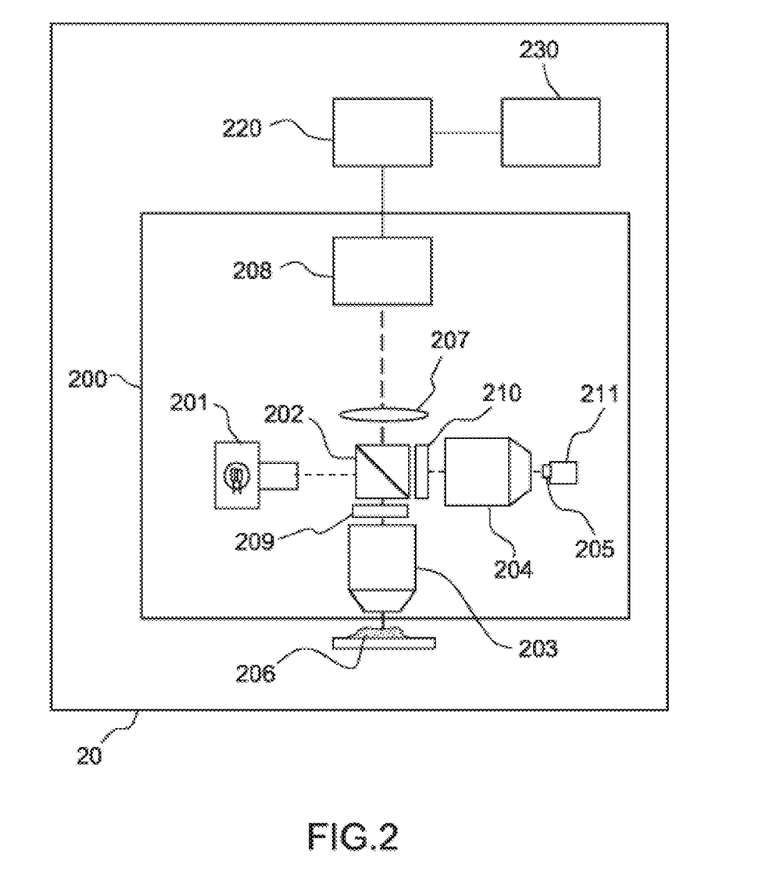
FIG. 2 is a theoretical block diagram of an embodiment of an imaging system according to the present description.

An embodiment of an imaging system 20 suitable for implementing a method for imaging a three-dimensional sample according to the present description is schematically represented in FIG. 2.

The imaging system 20 comprises an interference device 200, an acquisition device 208 and at least one processing unit 220.

The interference device 200 is adapted to produce optical interferences between, on the one hand, reference waves obtained by reflection of the light emitted by a light source 201, spatially incoherent and of low coherence length, by each elementary surface of a reflection surface 205 of a reference arm of the interference device and, on the other hand, of the object waves obtained by backscattering of the light emitted by the same source by each voxel of a slice of a sample 206 depthwise in the sample, the sample 206 being disposed on an object arm of the interference device, said voxel and said elementary surface corresponding to the same point of the imaging field.

The light source 201 is a source that is incoherent or of low coherence length (in practice, in a range from 1 to 20 micrometers), for example a halogen lamp or an LED. According to one or more exemplary embodiments, the light source 201 can form part of the imaging system 20, as in the example of FIG. 2, or can be an elemental external to the imaging system, the imaging system being adapted to work with light waves emitted by the source.

The acquisition device 208 allows the acquisition of at least one two-dimensional interferometric signal resulting from the interferences between the reference waves and the object waves.

The processing unit 220 is configured to execute at least one step of processing of at least one two-dimensional interferometric signal acquired by the acquisition device 208 and/or at least one step of image generation in accordance with at least one of the imaging methods according to the present description, in order to generate at least one image of the sample slice.

In one embodiment, the processing unit 220 is a computing device comprising a first memory CM1 (not represented) for the storage of digital images, a second memory CM2 (not represented) for the storage of program instructions and a data processor, capable of executing program instructions stored in this second memory CM2, in particular to control the execution of at least one step of processing of at least one two-dimensional interferometric signal acquired by the acquisition device 208 and/or of at least one step of image computation in accordance with at least one of the imaging methods according to the present description.

The processing unit can also be produced in integrated circuit form, comprising electronic components suitable for implementing the function or functions described in this document for the processing unit. The processing unit 220 can also be implemented by one or more physically distinct devices.

The acquisition device 208 is for example an image sensor, of CCD (Charge-Coupled Device) or CMOS (Complementarity metal-oxide-semiconductor) camera type. This acquisition device is capable of acquiring images at a high rate, for example with a frequency of 100 Hz. Depending on the dynamics of the sample studied, and more specifically the dynamics of the movements within the sample, it will be possible to use the cameras operating front a few Hz up to several KHz.

According to one embodiment, the interferometer 200 comprises a beam-splitter element 202, for example a non-polarizing splitter cube, making it possible to form two arms. In one of the arms, which will hereinafter be called "reference arm" there is the reflection surface 205, flat, for example a mirror. The other arm, which will hereinafter be called "object arm", is intended to receive, in operation, the three-dimensional diffusing sample 206, of a slice of which there is a desire to produce a tomographic image at at least one depth according to one of the methods of the present description.

In the example of FIG. 2, the interferometer is of Linnik interferometer type and comprises two identical microscope lenses 203, 204 arranged on each of the arms. The reflection surface 205 is thus located at the focus of the lens 204 of the reference arm and the sample 206 is intended to be positioned at the focus of the lens 203 of the object arm. Other types of interferometers can be envisaged for the implementation of the methods according to the present description, and in particular interferometers of Michelson, Mirau, Fizeau and other such types.

At the output of the interferometer 200 there is an optic 207, for example achromatic doublet, whose focal length is adapted to allow a suitable sampling of the sample 206 by the acquisition device 208, and which makes it possible to conjugate the planes situated at the foci of the two lenses in one and the same plane at the output of the interference device. The acquisition device 208 is placed in the latter plane in order to acquire the interference signals produced by the interference device. In order to not limit the resolution permitted by the microscope lenses 203 and 204, the choice of the focal length of the optic 207 will be in line with the Shannon criterion. The focal length of the optic 207 is for example a few hundreds of millimeters, typically 300 mm.

Glass plates 209, 210 are if necessary provided on each of the arms to compensate the dispersion.

Since the light source 201 has a low coherence length, interferences between the light reflected by the reflection surface 205 (reference wave) and that backscattered by the sample 206 occur only when the optical paths in the two arms are equal, to within the coherence length. Thus, interferences occur between the reference wave and the light backscattered by each voxel of a slice situated in a plane at right angles to the optical axis of the object arm, at a given depth of the sample, called coherence slice, a voxel being an elementary volume defined in the coherence slice. The light backscattered by each voxel is representative of the amplitude of the coherent sum of the waves backscattered by all of the diffusing elementary structures present in this voxel.

The interferometric signals resulting from the optical interferences between the reference waves and the waves backscattered by the different voxels are acquired in parallel at an instant t by the acquisition device 208. The result thereof is an interferometric image S corresponding to the state of interference at a given instant t of the coherence slice. An interferometric image element or image pixel situated at a given position (x,y), defined in relation to a two-dimensional coordinate system associated with the acquisition device 208, exhibits a value S(x,y,t) which corresponds to the intensity of the interferometric signal, acquired at the instant t at the position (x,y), resulting from the interference between the wave backscattered by the voxel of corresponding position in the sample and the reference wave reflected by an elementary surface of the reflection surface 205 of the reference arm of corresponding position.

More specifically, the light intensity S(x, y, t) of the interferometric signal acquired by the acquisition device 208 at the position (x,y) and at the instant t, can be expressed in the form:

$$S(x, y, t) = \frac{S_0}{4}\left(RA(x, y) + RB(x, y, t) + R_{ref} + 2\sqrt{RB(x, y, t)R_{ref}}\cos\phi(x, y, t)\right) \quad (1)$$

in which:

$S_0$ is the light intensity of the incident wave the input of the interferometer;

$RA(x, y)$ is an equivalent reflection coefficient, proportional to the intensity of the light backscattered by the sample which does not interfere, that is to say the light backscattered by structures of the sample situated outside of the coherence slice;

$RB(x, y, t)$ is an equivalent reflection coefficient, proportional to the intensity of the light backscattered by a voxel of the sample 206 in the coherence slice, at a given position (x,y) and at a given instant t;

$R_{ref}$ is the reflection coefficient of the reference surface (reflection surface 205);

$\phi(x, y, t)$ is the relative phase between the reference wave and the wave backscattered by the voxel of the sample at the position (x, y) and at the instant t.

The processing unit 220 is configured to generate an image of the sample 206 from at least one two-dimensional interferometric signal obtained by the acquisition device 208.

Different methods for using this imaging system and for generating images from two-dimensional interferometric signals produced by this imaging system are described in more detail hereinbelow.

DC-FFOCT Imaging Method

Figure 3:
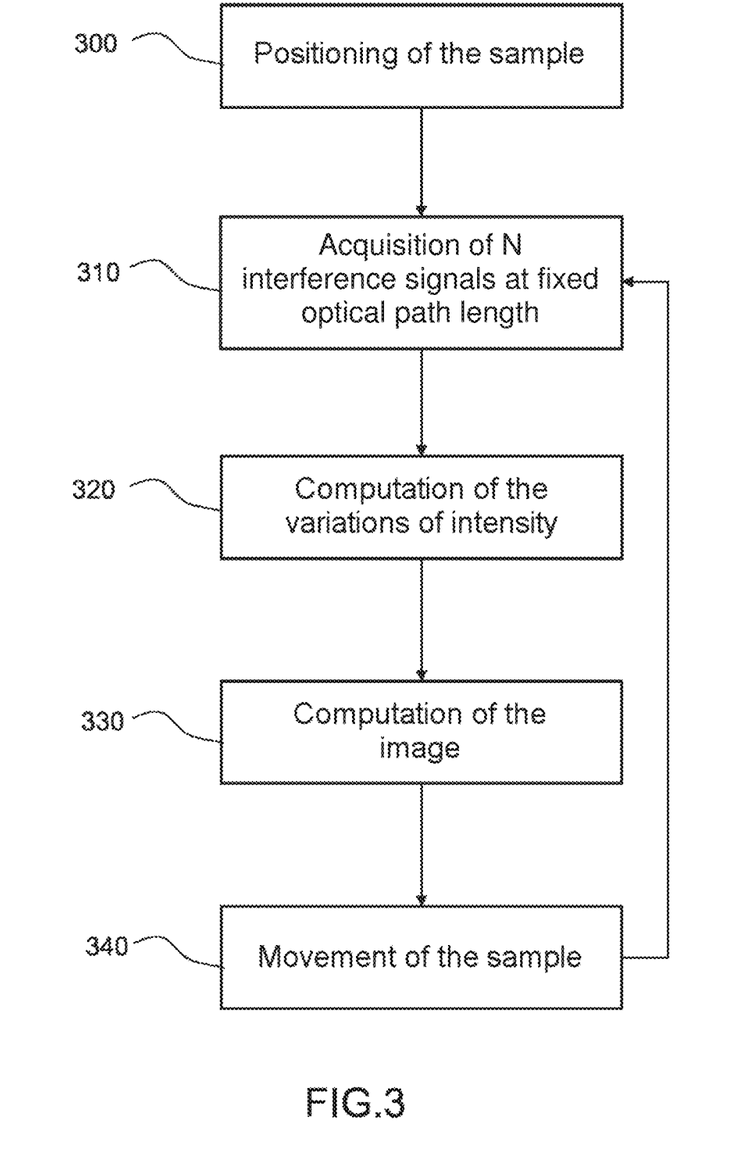
FIG. 3 is a flow diagram of an embodiment of an imaging method according to the present description; this method will hereinafter be called DC-FFOCT imaging method.

The main steps of an embodiment of an imaging method according to the present description, called DC-FFOCT (for "Dynamic Contrast FFOCT"), are described with reference to FIG. 3. This method is applied in particular to intracellular imaging and can be implemented by the imaging system 20.

In an initial step 300, the DC-FFOCT imaging method is initialized and a sample 206 is placed in the object arm of the interference device 200 at a position making it possible to analyze a first sample slice. This first slice is the current slice for the first execution of the steps 310 to 330 described hereinbelow.

In the step 310, a temporal succession of N two-dimensional interferometric signals of the current slice of the sample 206 is acquired by the acquisition device 208 with fixed optical path difference between the object arm and the reference arm. In particular, no variation of the optical path difference is produced in this case, unlike what is done for a full-field OCT imaging method according to the prior art.

According to one embodiment, the optical path difference is maintained fixed by keeping both the reflection surface in the reference arm and the sample 206 in the object arm of the interference device 200 at a fixed position. In the absence of variation of the optical path difference, the analysis of the interference signals obtained for a sample slice makes it possible to obtain a two-dimensional interferometric signal clearly revealing the movements internal to the sample 206 for the structures present in this slice of the sample.

The period of acquisition of the succession of two-dimensional interferometric signals and/or the acquisition frequency (and therefore the number of two-dimensional interferometric signals) can be chosen in a way suited to the characteristics of the cellular or intracellular movements to be revealed. For example, the more rapid these movements are, the higher the acquisition frequency will be chosen to be so as to meaningfully sample the different intensities of the interferometric signal at a given point. On the other hand, for slower movements, a lower frequency and a longer acquisition period may prove more suitable. The number N is chosen typically between $10^2$ and $10^4$, for example around 1000, for an acquisition frequency of between 100 and 1000 images per second, typically 100 images per second, i.e. one acquisition over a period of between 0.1 and 100 seconds, typically ten or so seconds. These parameters can vary according to the applications targeted: as a function of the nature of the cells, of the different pathologies for which the images are to be generated or of the wavelength used. With the cameras working from a few Hz up to a kHz, a sampling is obtained that is suited to the different applications.

The acquisition of the N two-dimensional interferometric signals (step 310) results in N interferometric images $SN_i(x,y)$, in which $SN_i(x,y)$ is the intensity of the signal acquired at the position (x,y) by the detection device, i being an integer number varying from 1 to N and (x,y) representing the position, in relation to a two-dimensional coordinate system associated with the acquisition device 208. These interferometric images are stored in the first memory CM1 that can be accessed by the image processing unit 220 or else are transmitted to the processing unit 220.

In accordance with the equation (1) above, each light intensity $SN_i(x,y)$ of the interferometric signal acquired at the position (x,y) at the instant $t=t_i$ takes the form:

$$SN_i(x, y) = \frac{S_0}{4}\left(RA(x, y) + RB_i(x, y) + R_{ref} + 2\sqrt{RB_i(x, y)R_{ref}}\cos\phi_i(x, y)\right) \quad (2)$$

in which $S_0$, $RA(x,y)$, $R_{ref}$ were defined in the equation (1) above, $RB_i(x,y)$ is the reflection coefficient proportional to the light intensity backscattered at the instant $t_i$ by a voxel of the sample 206 at a given position (x, y) in the coherence slice, and $\phi_i(x, y)$ is the relative phase between the reference wave and the wave backscattered by the voxel of the sample at the position (x, y) at the instant $t_i$.

In practice, the applicants have shown that movements of the diffusers along an axis parallel to the optical axis of the object arm ("vertical" movement) result in variations of the relative phase $\phi(x, y)$ between the reference wave and the backscattered wave whereas movements of the diffusers in a plane at right angles to the optical axis of the object arm ("horizontal" movement) result in variations of the reflection coefficient RB(x,y) proportional to the backscattered light intensity. In practice, the fluctuations of intensity between the light intensities $SN_i(x,y)$ result from both "horizontal" and "vertical" movements.

The processing unit 220 of the imaging system is then used to compute an image, called dynamic contrast image or DC-FFOCT image, representative of temporal variations of intensity between these N two-dimensional interferometric signals acquired by the acquisition device 208. The computation of this dynamic contrast image comprises the steps 320 and 330 hereinbelow.

In the step 320, for each possible position (x,y) for a pixel in an interferometric image acquired by the acquisition device 208, a value is computed for at least one parameter VN(x,y) representative of the temporal variations of intensity of the two-dimensional interferometric signals $SN_i(x,y)$ acquired at a corresponding position (x,y) in the step 310 for the current slice of the sample 206. The temporal variations of intensities of the two-dimensional interferometric signals $SN_i(x,y)$ are due in particular to the temporal variations of the coefficient $RB_i(x,y)$ and of the relative phase $\phi(x,y)$, for example because of the movements of diffusers, such as certain intracellular elements in the case of a cell, within a voxel, the other terms being substantially constant over the period of acquisition of the N interferometric signals.

In one embodiment, the parameter VN(x,y) is representative of the characteristics of the statistical distribution of the intensities of the two-dimensional interferometric signals acquired, in particular of the temporal dispersion of these intensities.

This parameter VN(x,y) is for example a function of the standard deviation of the intensities $SN_i(x,y)$, i varying from 1 to N in this succession of N interferometric images. For example:

$$VN(x, y) = \sqrt{\frac{1}{N}\sum_{i=1}^{N}(SN_i(x, y) - MN(x, y))^2} \quad (3)$$

$$\text{with } MN(x, y) = \frac{1}{N}\sum_{i=1}^{N}SN_i(x, y) \quad (4)$$

This parameter VN(x,y) can also be a mean value of standard deviations computed respectively over different subsets of the N interferometric images. Other statistical or mathematical parameters making it possible to characterize the amplitude of the temporal variations of intensity of the pixels and/or the dispersion of these intensities can be used, such as the variance (standard deviation squared), the interquartile deviation, the extent (difference between its highest value and its lowest value), etc.

The parameter VN(x,y) can also be obtained by various space-time signal processing methods: self-correlation coefficient of the temporal signals $SN_i(x,y)$ obtained for each pixel (x,y), or breakdown into singular values for example.

In the step 330, a dynamic contrast image IB or DC-FFOCT image is computed that is representative of temporal variations of intensity between the N two-dimensional interferometric signals of the current slice of the sample 206.

In one embodiment, each pixel IB(x,y) of the image IB, situated at a given position (x,y), represents the value computed for this given position for the parameter chosen in the step 320. For example, a pixel of the image IB which is situated at a given position (x,y) and/or at least one component of this pixel, defined in relation to a colorimetric representation space, exhibits a value which is a function of the value computed for the parameter concerned for the corresponding position (x,y) from the intensities $SN_i(x,y)$, for i=1 to N, of the N interferometric signals acquired in the step 310.

For example, when the colorimetric representation space used for the image IB is a representation on gray levels, the value of the pixel IB(x,y) can be equal to or a function of the value VN(x,y) to within a scaling factor so as, for example, to obtain a gray level coded on a given number of bits.

According to another example, when the colorimetric representation space used for the image IB is a representation according to the RGB (Red, Green, Blue) colorimetric representation space, at least one of the components R, G or B of the pixel IB(x,y) of position (x,y) in the image IB will be equal to or a function of VN(x,y) to within a scaling factor so as, for example to obtain a colorimetric component coded on a given number of bits.

According to yet another example, when the colorimetric representation space used for the image IB is a representation according to the YUV (luminance/chrominance) colorimetric representation space, at least one of the components Y, U or V of the pixel IB(x,y) of position (x,y) in the image IB will be equal to or a function of VN(x,y) to within a scaling factor so as, for example, to obtain a component coded on a given number of bits.

The dynamic image IB thus produced can then be displayed on a display screen 230 linked to the image processing unit.

Figure 4:
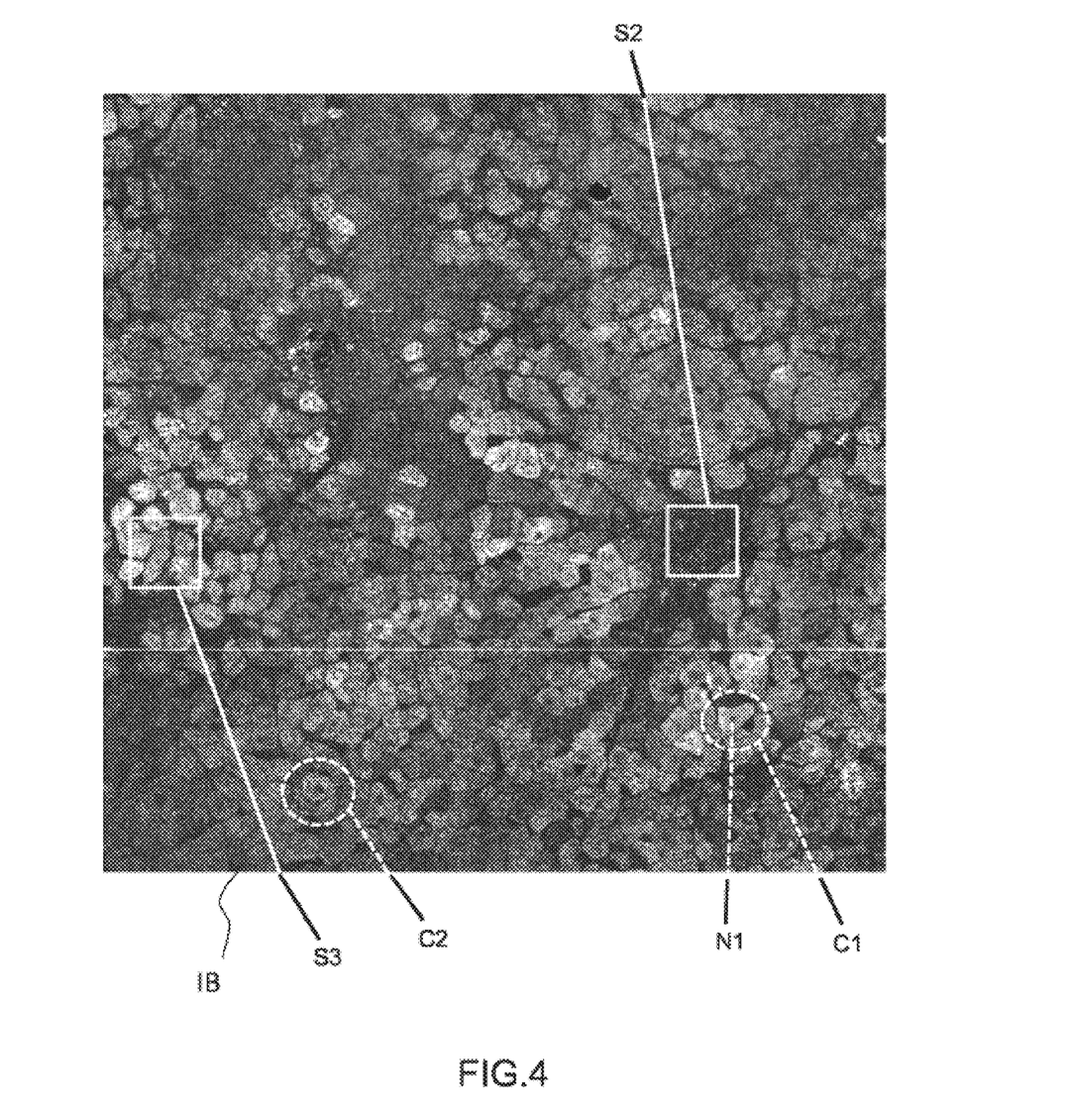
FIG. 4 is an example of an image, called DC-FFOCT image, of the same sample as that represented in FIG. 1, at the same point, in the same coherence slice, obtained by using a DC-FFOCT imaging method according to the present description.

FIG. 4 represents an example of a dynamic image IB produced by the DC-FFOCT imaging method for the same coherence slice of the sample as that represented in the image of FIG. 1. The pixels of this image are coded on gray levels. The image corresponds to a sample zone of 800 µm by 800 µm size extracted from a rat liver. In this image, fine structures are distinguished, in particular individual cells, which were not present in FIG. 1. Not only are hepatic cells C1, C2 distinguished (see the zones outlined in dotted lines), but also their nucleus (darker circular zone N1 in the middle of the hepatic cell C1). Such details were not present or not visible in the image of FIG. 1, obtained by a full-field OCT imaging technique according to the prior art for the same sample slice.

The example of FIG. 4 illustrates in particular the benefit of the method according to the present description for cellular and intracellular imaging and in particular highlights the significant enhancement of the contrast of the cellular and intracellular structures.

On a microscopic scale, in particular at the cellular or intracellular level, various movements occur: (low or circulation of liquids, but also intracellular movements of different organites (or "organelles") such as cell nuclei, mitochondria, lysosomes, etc. This is true not only for the in-vivo tissues of living humans and animals or plants, but also for the samples freshly taken from the living humans and animals or plants. For example, the complete death (apoptosis) of a human cell of a sample only occurs 24 to 48 hours after the taking of this sample from the living person. During this time period, the continued life and movement can be detected, particularly in the cells.

The biological tissues also exhibit optical backscattering properties such that approximately a few thousandths to a few millionths of the power of the incident light beam are backscattered by these tissues because of the presence in these tissues of diverse structures, hereinafter in the description called "diffusers", whose size is smaller than or close to that of the wavelength of the light beam.

The movements of the fine structures present in the tissue like the intracellular structures produce phase differences of the backscattered beam and, through the interferences, temporal variations of the light intensity of the signal acquired by the interferential microscope. These temporal variations of intensities can be detected for a given time period, by acquisition at a given frequency, of a succession of two-dimensional interferometric signals of the same sample slice. By proceeding with an acquisition of two-dimensional interferometric signals with fixed optical path difference between the object arm and the reference arm, the applicants have shown that it is possible to sample, at the desired rate, the two-dimensional interferometric signals resulting from the interference states occurring in succession in a slice of the sample and proceed with an analysis of the temporal variations of intensity between these two-dimensional interferometric signals in order to produce an image of the tissue regions of the sample in which the movements which are the source of these temporal variations of intensity occur.

Figure 5A:
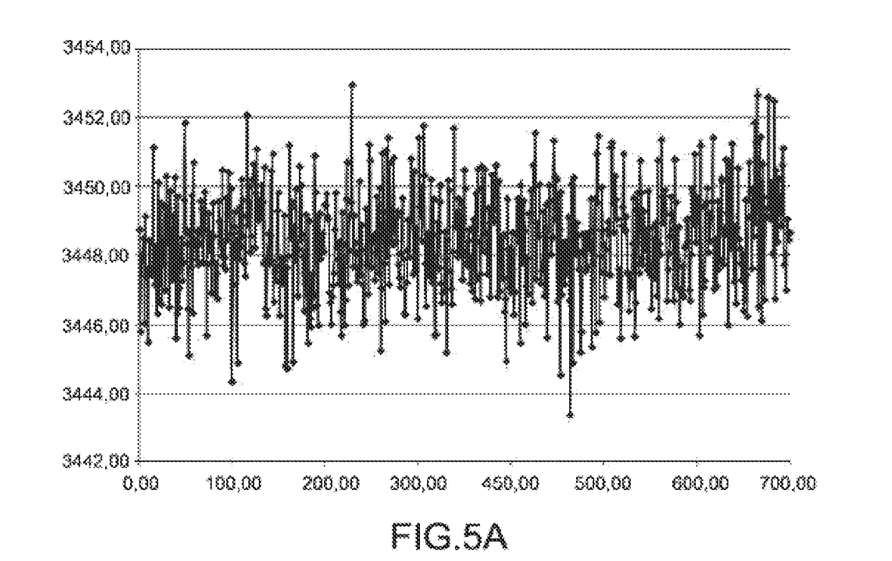
FIGS. 5A and 5B represent curves of variation of intensity of the signals acquired in an example of DC-FFOCT imaging method at 2 points of the sample of which an image is presented in FIG. 4, the 2 points forming part of zones respectively exhibiting an absence of intracellular movement and a presence of an intracellular movement.
Figure 5B:
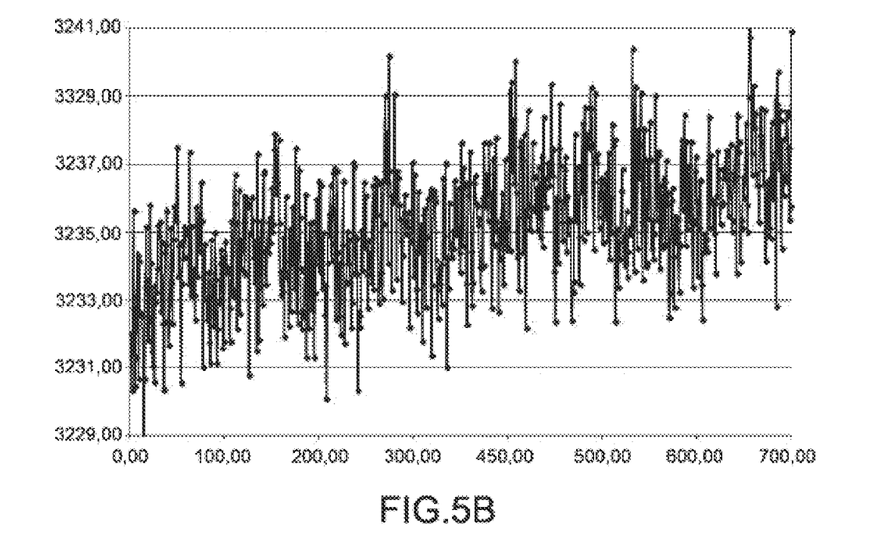
Figure 6A:
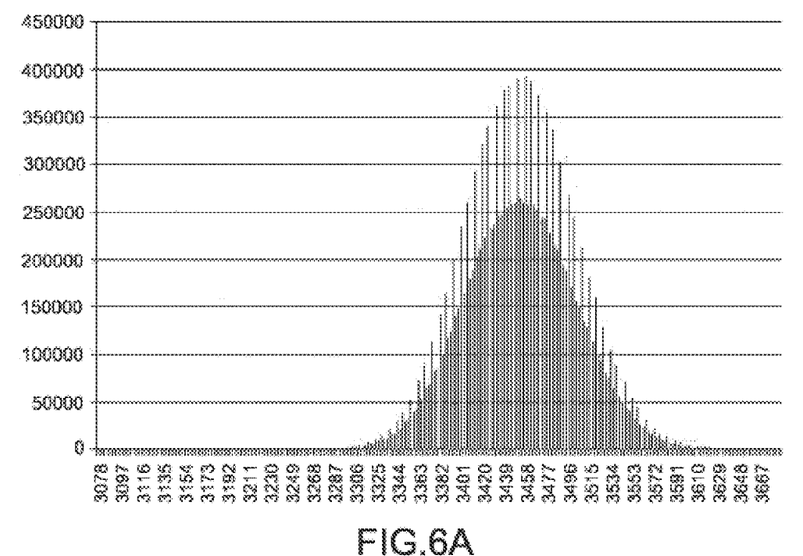
FIGS. 6A and 6B represent the statistical distribution of the signaling intensities variation curves are represented respectively in FIGS. 5A and 5B.
Figure 6B:
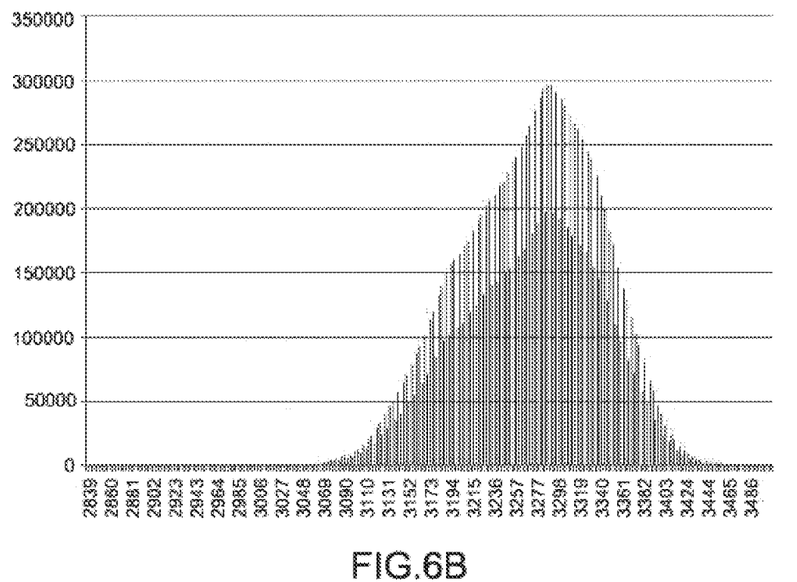

By way of examples, FIGS. 5A and 5B illustrate the temporal variations of the intensities of the two-dimensional interferometric signals acquired by the acquisition device 208 for two positions respectively corresponding to two positions $(x_1, y_1)$ and $(x_2, y_2)$ in the image IB represented in FIG. 4. FIGS. 6A and 6B represent the statistical distributions of the signal intensities for which the variation curves are represented respectively in FIGS. 5A and 5B. For a first position $(x_1, y_1)$ in a two-dimensional coordinate system associated with the acquisition device 208, it can be seen in FIG. 5A that the intensities of the signals recorded on 12 bits vary overall between 3445 and 3450 (i.e. a variation of approximately 5 units) with a temporal and average distribution that is substantially stable over time. At this position $(x_1, y_1)$, which is for example a position situated in the zone S2 represented in FIG. 4, centered on collagen fibers, the absence of movement is deduced. For a second position $(x_2, y_2)$, which is for example a position situated in the zone S3 represented in FIG. 4, inside a hepatic cell, it can be seen in FIG. 5B that the intensities of the signals vary overall between 3231 and 3239 (i.e. a variation of approximately 9 units) with a greater temporal dispersion and a substantially variable average over time. FIG. 5B is representative, on the other hand, of a position $(x_2, y_2)$ where there is an intracellular movement. By comparison to FIGS. 6A and 6B, it is possible to observe a greater temporal dispersion in the distribution, represented in FIG. 6B, of the intensities of the signal, represented in FIG. 5B, in relation to the temporal dispersion, represented in FIG. 6A, of the intensities of the signal, represented in FIG. 5A.

After having computed a DC-FFOCT image for a given coherence slice, a determination is made in the step 340 as to whether to acquire a DC-FFOCT image for another sample slice. In the affirmative, the position of the sample along the optical axis of the object arm is modified during the step 340 and the steps 310 to 330 are repeated for this second slice of the sample which becomes the current slice. Otherwise, the method is terminated.

A three-dimensional image of the sample 206 can thus be obtained by varying the position of the sample 206, and therefore the position depthwise in the sample 206 of the coherence slice for which the optical paths in the two arms of the interference device are equal, and by repeating the interferometric signal acquisition and image generation procedure for this coherence slice.

The steps 320 and 330 of generation of the dynamic image IB can also be executed after the step 340, subject to retaining in memory, for each sample slice, the N interferometric images acquired in the step 310.

The image acquisition steps 310 for a sample slice can also be executed in parallel to the steps 320 and 330 of generation of the dynamic image for a preceding slice of the sample 206.

CDC-FFOCT Imaging Method

Figure 7:
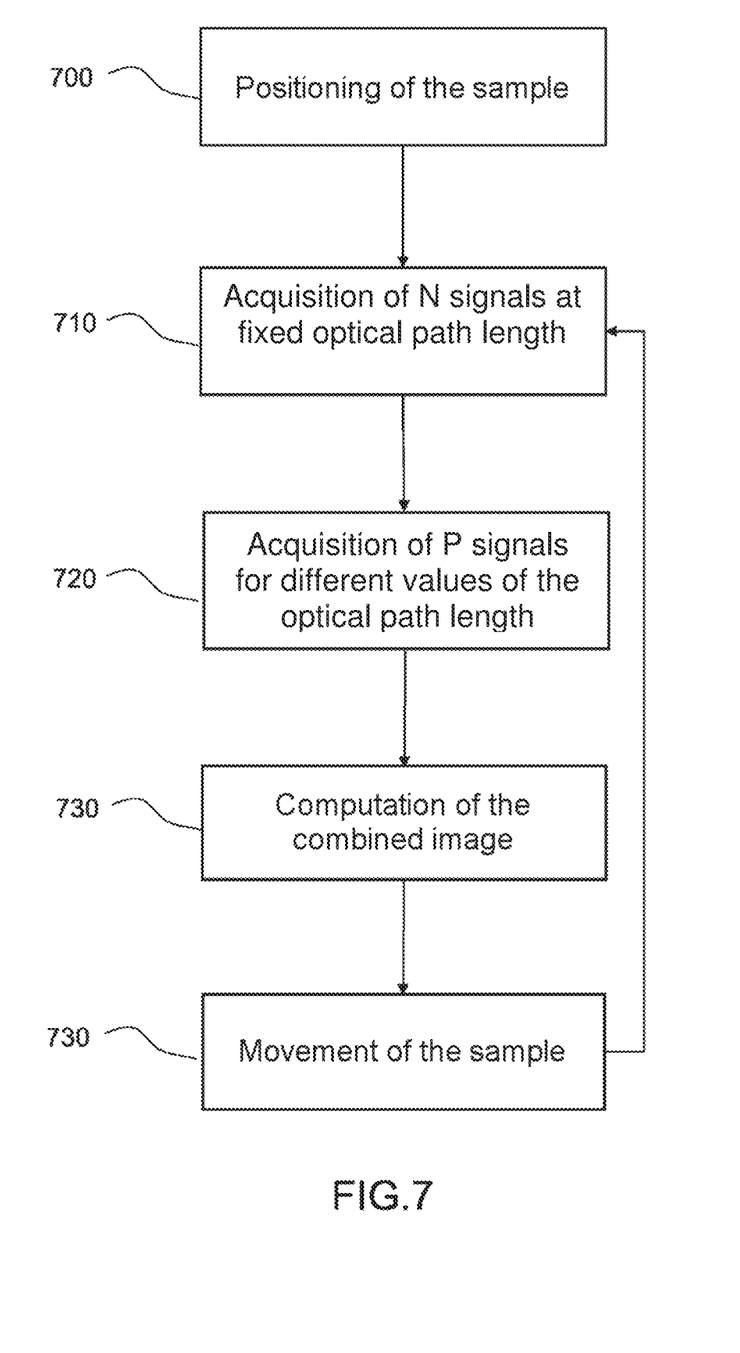
FIG. 7 is a flow diagram of an embodiment of an imaging method for the generation of a combined image; such a method will hereinafter be called CDC-FFOCT (for "Combined Dynamic Contrast FFOCT") imaging method.

The steps of an embodiment of the method for generating a combined image, also called CDC-FFOCT (for "Combined Dynamic Contrast FFOCT") imaging method are described with reference to FIGS. 7 and 8.

The CDC-FFOCT imaging method is implemented by using the imaging system 20 and a modulation device 211, suitable for varying the relative phase between the reference wave and the backscattered wave. The modulation device makes it possible, according to one example, to generate a relative movement of the reflection surface in relation to the sample, for example by means of a piezoelectric plate for the movement of the reflection surface; the result thereof is a variation of the optical path difference between the object arm and the reference arm of the interference device 200, as will be described in more detail hereinbelow.

In an initial step 700, the CDC-FFOCT imaging method is initialized and a sample 206 is placed in the object arm of the interference device 200 at a position that makes it possible to analyze a first sample slice. This first slice is the current slice for the first execution of the steps 710 to 730 described hereinbelow.

The step 710 is identical to the step 310 described for the DC-FFOCT imaging method. In particular, a temporal succession of N two-dimensional interferometric signals of the current slice of the sample 206 is acquired by the acquisition device 208 with fixed optical path difference between the object arm and the reference arm.

In the step 720, according to an exemplary embodiment, a succession of P two-dimensional interferometric signals of the current slice of the sample 206 is acquired by the acquisition device 208 for different values of the optical path difference between the object arm and the reference arm of the interference device 200. The variation of the optical path difference is effected for example by movement, parallel to the optical axis of the reference arm, of the reference surface 205 by means of the piezoelectric plate 211, for example a movement according to a sinusoidal function resulting in a modulation of the optical path difference. A synchronization with the image capture performed by the acquisition device 208 can then make it possible to record interferometric images for predefined values of the phase of the two-dimensional interferometric signals.

From the acquisition of the interferometric signals in the step 720, there result P interferometric images, denoted $SP_j$, in which $SP_j(x,y)$ is the intensity of the interferometric signal acquired at the position $(x,y)$ and for a relative phase between the reference wave and the backscattered wave $\varphi = \varphi_j$, j being an integer number varying from 1 to P, $P \geq 2$, and $(x,y)$ representing the position in relation to a two-dimensional coordinate system associated with the acquisition device 208. These interferometric images $SP_j(x,y)$ are stored in a memory CM1 accessible by the processing unit 220 or else are transmitted to the processing unit 220.

The light intensity $SP_j(x,y)$ of the interference signals acquired by the acquisition device 208 for the position (x,y) and for a relative phase $\varphi=\varphi_j$ can be written in the form:

$$SP_j(x, y) = \frac{S_0}{4}\left(RA(x, y) + RB(x, y) + R_{ref} + 2\sqrt{RB(x, y)R_{ref}} \cos\phi_j(x, y)\right) \quad (5)$$

in which $S_0$, $RA(x,y)$, $R_{ref}$ have been defined in the equation (1) above, $RB(x,y)$ is an equivalent reflection coefficient proportional to the light intensity backscattered by a voxel of the sample 206 at a given position (x, y) in the coherence slice and $\phi_j(x, y)$ is the relative phase between the reference wave and the wave backscattered by the voxel of the sample at the position (x, y).

Each pixel value of the resulting full-field OCT image, corresponding to the coefficient RB (x, y), is obtained by a combination of the intensity values $SP_j(x,y)$ according to known methods.

In the case of a variation of the phase resulting from a temporal modulation of the relative movement of the reflection surface in relation to the sample for example, the phase $\phi_j(x, y)$ corresponds to the relative phase between the reference wave and the wave backscattered by the voxel of the sample at the position (x, y) and at an instant $t=t_j$. The applicants have demonstrated however that the temporal fluctuations of the coefficient RB (x, y) are very low in relation to the coefficient RB (x, y) sought (typically a factor 1000). It is therefore possible to reasonably approximate RB (x, y) as constant as a function of time.

In one embodiment, P=2 interferometric images are acquired, for two values of the optical path difference corresponding to a phase shift of $\pi$ between the relative phases $\phi_j(x, y)$. Thus, a first interferometric image is recorded for a first value of the relative phase $\phi_1(x, y)$ and a second interferometric image is recorded for a second value of the relative phase, $\phi_2(x, y)=\phi_1(x, y)+\pi$ for example. Each pixel value of the resulting full-field OCT image, corresponding to the coefficient RB (x, y), is obtained by computing the difference between two intensity values $SP_1$ (x,y) and $SP_2$ (x,y) obtained respectively for two relative phase values $\phi_1(x, y)$ and $\phi_2(x, y)$ then by calculating therefrom the absolute value of the difference between the two values $SP_1$ (x,y) and $SP_2$ (x,y).

The technique described previously of acquisition of P two-dimensional interferometric signals corresponds to what is used in an FFOCT imaging method according to the prior art. Any other method for computing RB (x, y) in accordance with a full-field FFOCT imaging method according to the prior art can be used.

In particular, it is possible to proceed in a known manner with a modulation of the optical path difference and with a detection synchronized by the detection device in order to acquire P interferometric signals for P values of the optical path difference to determine the FFOCT image. It is also possible to integrate, the interferometric signal over fractions of modulation period, for example over 4 periods, to obtain the amplitude and the phase of the interferometric signal.

It is also possible to do the acquisition at the same time (at the same instant) of several interferometric images corresponding to different relative phase values, for example two relative phase values separated by $\pi$, for example by spatial splitting of 2 beams phase-shifted by $\pi$.

In the step 730, the processing unit 220 of the imaging, system is then used to compute an image, called combined image or CDC-FFOCT image, representative also of the temporal variations of intensity between the N two-dimensional interferometric signals acquired by the acquisition device 208 in the step 710.

The combined image IC is computed front, on the one hand, the intensities of the P two-dimensional interferometric signals acquired by the acquisition device 208 in the step 720 and, on the other hand, from the temporal variations of intensities between the N two-dimensional interferometric signals acquired by the acquisition device 208 in the step 710.

In a first embodiment, a first intermediate image IB, or dynamic contrast image, is computed from the temporal variations of intensity between the N two-dimensional interferometric signals acquired by the acquisition device 208 in the step 710 and a second intermediate image IA, called tomographic image, is computed from the intensities of the P two-dimensional interferometric signals acquired by the acquisition device 208 in the step 720. The combined image IC is then computed by pixel-to-pixel combination of these two intermediate images IA and IB. Pixel-to-pixel combination should be understood here to mean that a pixel IA(x,y) of position (x,y) in the image IA is combined with the pixel IB(x,y) of the same position (x,y) in the image IB.

In a second embodiment, no intermediate image is generated and the combined image IC is computed by directly computing the pixels of the combined image from the intensities of the interferometric signals acquired. In particular, for a pixel of given position (x,y) in the combined image IC, a pixel value IC(x,y) is computed as a function, on the one hand, of the intensities of the P two-dimensional interferometric signals acquired at a point of corresponding position in a two-dimensional coordinate system associated with the acquisition device and, on the other hand, from the temporal variations of intensity of the N two-dimensional interferometric signals acquired at a point of corresponding position in a two-dimensional coordinate system associated with the acquisition device.

In the first embodiment, as in the second, a pixel value IC(x,y) of given position (x,y) in the combined image is computed by combination of two pixel values IC(x,y) and IB(x,y), in which:

- the value IA(x,y) is computed from the intensities of the P two-dimensional interferometric signals acquired for different values of the optical path difference for the position (x,y) and represents the coefficient RB(x,y) proportional to the intensity of the wave backscattered by a given voxel of the coherence slice of the sample, and
- the value IB(x,y) is computed from the intensities of the N two-dimensional interferometric signals acquired with fixed optical path difference and represents the temporal variations of the intensities determined between the N two-dimensional interferometric signals acquired at the point of corresponding position in a coordinate system associated with the acquisition device.

The value IB(x,y) is computed according to the method described for the step 330 for example. In particular, the value IB(x,y) can be computed as a function of the value of at least one parameter VN(x,y) representative of the temporal variations of the intensities $SN_i(x,y)$ between the N interferometric signals.

It is assumed here, for the combination of pixel values, that the acquisition of the signals performed in the steps 710 and 720 has been performed such that the signal $SN_i(x,y)$ acquired for the position (x,y) in the step 710 originates front the same voxel of the sample 206 as the signal $SP_j(x,y)$ acquired for the position (x,y) in the step 720: this will be the case if neither the sample 206, nor the acquisition device 208 is moved during the execution of the steps 710 and 720 and the acquisition device 208 acquires images of the same resolution in the steps 710 and 720 and by using the same two-dimensional coordinate system.

The combination of pixel value IA(x,y) and IB(x,y) is performed such that the information contained respectively in each of the images IA(x,y) and IB(x,y) for a given voxel of the sample 206 is present in the resulting combined image IC. This combination can be performed such that a user viewing the resulting image IC is able to discriminate the structures revealed in the image IA (tomographic image) from the fluctuations of structures revealed in the image IB (dynamic contrast image).

In particular, the value IC(x,y) of a pixel of the combined image which is situated at a given position (x,y) in the image IC is function of the value IA(x,y) of the pixel situated at this same position (x,y) in the tomographic image IA and a function of the value computed for this position (x,y) for the parameter used in the step 720. The pixel IC(x,y) can exhibit a component defined in relation to a colorimetric representation space.

Thus, a user will be able to view, for a given point of the sample 206, an image containing both the information originating from a known full-field interference microscopy imaging in incoherent light and the information on the movements of the fine structures of the sample 206 revealed by the DC-FFOCT imaging method according to the present description.

Various methods for combining these values IA(x,y) and IB(x,y) are possible and the methods described hereinbelow are given as nonlimiting examples.

A first combination method consists in assigning, for each position (x,y) in a zone of the combined image, the pixel value IA(x,y) to a first colorimetric component of a pixel IC(x,y) of the image IC and the pixel value IB(x,y) to a second colorimetric component of this pixel IC(x,y). For example, by using a representation according to the RGB colorimetric representation space, the component R of the pixel IC(x,y) of position (x,y) in the image IC will be equal to the pixel value IA(x,y) and the component B (Blue) of the pixel IC(x,y) of position (x,y) in the image IC will be equal to the pixel value IB(x,y) or vice versa. A second combination method consists in defining two look-up tables TA, TB (referred to by the acronym LUT), a first lookup table TA for the pixel values IA(x,y) and a second look-up table TB for the pixel values IB(x,y). Each look-up table TA, respectively TB, serves to compute, for each possible position (x,y) in a zone of the combined image, a pixel value TA(x,y), respectively TB(x,y), resulting from the transformation of the pixel value IA(x,y), respectively IB(x,y) by the look-up table TA, respectively TB. The value of a pixel IC(x,y) at a position (x,y) in the image IC is then obtained by a function of combination of the pixel value TA(x,y) and of the pixel value TB(x,y). This combination function is for example a "logic OR" of the pixel values TA(x,y) and TB(x,y), or else a function of addition of these two pixels or of computation of the mean or sum value weighted by weighting coefficients.

The resulting image IC can be a color image or a gray level image depending on the combination method chosen.

In the step 730, the combined image IC thus generated can then be displayed on a display screen 230 linked to the image processing unit.

Figure 8:
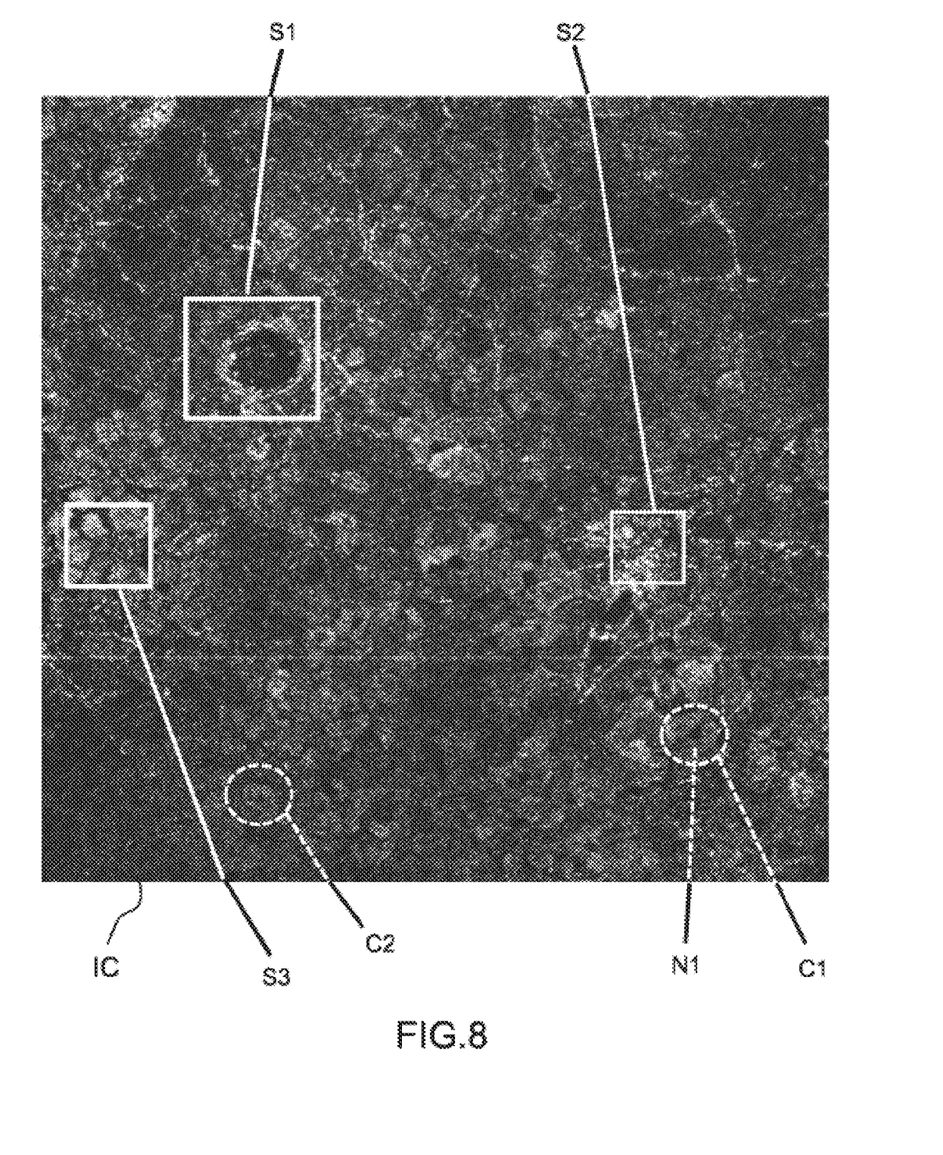
FIG. 8 is an example of an image, called CDC-FFOCT image, resulting from a CDC-FFOCT imaging method as described with reference to FIG. 7 and representing the same sample as that represented in FIGS. 1 and 4, at the same point and in the same coherence slice.

FIG. 8 represents an example of an image IC resulting from the combination of the image IA represented in FIG. 1 with the image IB represented in FIG. 4. The method used for the combination is for example the second method as described above. Each of these images represents one and the same zone and one and the same sample slice of 800 μm by 800 μm size as the zone and the slice imaged in figures IA and IB (biological tissue of rat liver). By comparison of the image IA of FIG. 1 with the image IC of FIG. 8, it clearly emerges that the image IC is much richer in fine structures than the image IA but nevertheless includes the information of the image IA of FIG. 1. These fine structures of the image IC correspond in reality to fluctuations detected in the slice of the sample concerned: the fine structures of the image of FIG. 8 are those originating from the image IB (FIG. 4) which has been combined with the image IA (FIG. 1).

As an example, in the image IA of FIG. 1, it is possible to distinguish numerous collagen fibers, a zone S2 of collagen fiber concentration and a large capillary in the zone S1, but individual cells are not distinguished. By contrast, in the image IB of FIG. 4, individual cells are distinguished in the zones C1, C2 or S3, but not the collagen fibers of the zone S2 or the large capillary of the zone S1. In the image IC, the collagen fibers (zone S2), the large capillary (zone S1) and the individual cells (zones C1, C2 or S3) are all distinguished.

By virtue of the combined image IC, a user can have a single image containing a great deal of visual information on the structures present in the slice of the sample, just as on the fluctuations, representative of the movements and cellular or intracellular activities of this same sample slice.

Once a CDC-FFOCT combined image is computed for a given coherence slice of the sample, a determination is made, in the step 740, as to whether to generate a CDC-FFOCT combined image for another sample slice. In the affirmative, the position of the sample along the optical axis of the object arm is modified in the step 740 and the steps 710 to 730 are repeated for this second slice of sample which becomes the current slice. Otherwise, the method is terminated.

A three-dimensional image of the sample 206 can thus be obtained by varying the position of the sample 206, and therefore the position depthwise in the sample 206 of the coherence slice for which the optical paths are the same in both arms of the interference device, and by repeating the interferometric signal acquisition and image generation procedure for this coherence slice.

The DC-FFOCT and CDC-FFOCT imaging methods described hereinabove are applied in particular to the acquisition of images of cells or of intracellular images, and can prove particularly useful for diagnosing cancer where the examination of the cellular details proves necessary. In particular, the dynamic origin of the contrast generated by the DC-FFOCT and CDC-FFOCT imaging methods can make it possible, in addition to viewing cellular details, to view the cellular activity and distinguish the metabolic status of a cell (overactivity, dead cell, necrosis).

They can also be applied generally in all situations where the different voxels of the coherence slice of the sample to be analyzed exhibit movements, activities, functions, mechanisms or physical-chemical properties leading to a temporal variation of light intensity reflected by these voxels. They are also applicable to any samples, whether these samples are biological or not.

The invention claimed is:

1. A system for full-field interference microscopy imaging of a diffusing three-dimensional sample comprising:
an interference device comprising:
an object arm configured to receive the sample, and a reference arm on which a reflection surface is arranged, the interference device being adapted to produce, when the sample is disposed on the object arm of the interference device, at each point of an imaging field, an interference between a reference wave obtained by reflection of incident light waves on an elementary surface of the reflection surface corresponding to said point of the imaging field, and an object wave obtained by backscattering of incident light waves by a voxel of a slice of the sample at a given depth, said voxel corresponding to said point of the imaging field;
an acquisition device configured to acquire, with fixed optical path difference between the object arm and the reference arm, a temporal succession of N two-dimensional interferometric signals resulting from the interferences produced at each point of the imaging field; and
a processing unit configured to compute an image representative of temporal variations of intensity between said N two-dimensional interferometric signals.

2. The imaging system as claimed in claim 1, wherein the processing unit is further configured to compute said image by computing, for each pixel of given position in said image, a pixel value as a function of a value of a parameter representative of the temporal variations of intensity of the N two-dimensional interferometric signals acquired at a point of corresponding position in a two-dimensional coordinate system associated with the acquisition device.

3. The imaging system as claimed in claim 2, wherein said parameter is representative of the temporal dispersion of the intensities of the N two-dimensional interferometric signals.

4. The imaging system as claimed in claim 2, wherein said pixel exhibits at least one component, defined in relation to a colorimetric representation space, whose value is a function of the value of said parameter.

5. A method for full-field interference microscopy imaging of a diffusing three-dimensional sample comprising:
placement of the sample on an object arm of an interference device;
production, by means of the interference device for each point of an imaging field, of an interference between a reference wave obtained by reflection of incident light waves on an elementary surface of a reflection surface of a reference arm of the interference device, said elementary surface corresponding to said point of the imaging field, and an object wave obtained by backscattering of the incident wave by a voxel of a slice of the sample at a given depth, said voxel corresponding to said point of the imaging field;
acquisition, with fixed optical path difference between the object arm and the reference arm, of a temporal succession of N two-dimensional interferometric signals resulting from the interferences for each point of the imaging field; and
computation of an image representative of temporal variations of intensity between the N two-dimensional interferometric signals.

6. The imaging method as claimed in claim 5, wherein the step of computation of the image comprises the computation, for each pixel of given position in said image, of a pixel value as a function of a value of a parameter representative of the temporal variations of intensity of the N two-dimensional interferometric signals acquired at a point of corresponding position in a two-dimensional coordinate system associated with the acquisition device.

7. The imaging method as claimed in claim 6, wherein said parameter is representative of the temporal dispersion of said intensities of the N two-dimensional interferometric signals.

8. The imaging method as claimed in claim 6, wherein said pixel exhibits at least one component, defined in relation to a colorimetric representation space, whose value is a function of the value of said parameter.

* * * * *